United States Patent
Gopalsamy et al.

(10) Patent No.: US 11,743,748 B2
(45) Date of Patent: Aug. 29, 2023

(54) DETECTION AND RECOVERY MECHANISMS FOR NETWORK INTERRUPTIONS

(71) Applicant: ZEBRA TECHNOLOGIES CORPORATION, Lincolnshire, IL (US)

(72) Inventors: Anandakumar Gopalsamy, Ronkonkoma, NY (US); Venkateswaran Narayanan, Bangalore (IN); Ambika Nagarajaiah, Bangalore (IN); Ohad Shatil, Dunwoody, GA (US); Sethuraman Vijayakumar, Madurai (IN); Dayal Madhukar Rai, Bangalore (IN); Alexander Punnamoottil Jacob, Palakkad (IN); Jonathan Chen, Medford, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 181 days.

(21) Appl. No.: 17/396,344

(22) Filed: Aug. 6, 2021

(65) Prior Publication Data

US 2023/0047290 A1 Feb. 16, 2023

(51) Int. Cl.
*H04W 24/04* (2009.01)
*H04W 76/10* (2018.01)
*H04W 24/08* (2009.01)

(52) U.S. Cl.
CPC .......... *H04W 24/04* (2013.01); *H04W 24/08* (2013.01); *H04W 76/10* (2018.02)

(58) Field of Classification Search
CPC ........ H04W 76/10; H04W 12/50; H04L 12/28
USPC ......................................... 370/329, 400, 401
See application file for complete search history.

(56) References Cited

U.S. PATENT DOCUMENTS

2007/0286222 A1 * 12/2007 Balasubramanian ....................... H04W 52/0222
370/412

* cited by examiner

*Primary Examiner* — Dang T Ton

(57) ABSTRACT

A computing device includes: a wireless communication interface; and a processor configured to: establish a connection with a wireless network; while a network-layer status of the connection is active, monitor attributes of the connection at the wireless communication interface, the attributes including (i) a number of uplink packets transmitted since a most recent downlink packet was received, and (ii) a time period elapsed since the most recent downlink packet was received; determine that the attributes meet recovery criteria indicative of a network-layer interruption in the wireless network; in response to the determination, control the wireless communication interface to initiate a recovery action to resolve the network-layer interruption.

21 Claims, 4 Drawing Sheets

US 11,743,748 B2

DETECTION AND RECOVERY MECHANISMS FOR NETWORK INTERRUPTIONS

BACKGROUND

Network connectivity may be provided for computing devices, including mobile devices such as tablet computers, smart phones, and the like, by the deployment of wireless local area networks (WLANs), e.g. within a facility or other operating environment. Such networks are implemented by various infrastructure elements, including access points, network switches, gateway devices and the like. In some instances, one or more infrastructure elements may interrupt the flow of data to and from a client computing device connected to the network, e.g. due to a software bug, corrupted routing table, or the like. Such infrastructural failures may lead to decreased or interrupted communications performance at the client computing device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
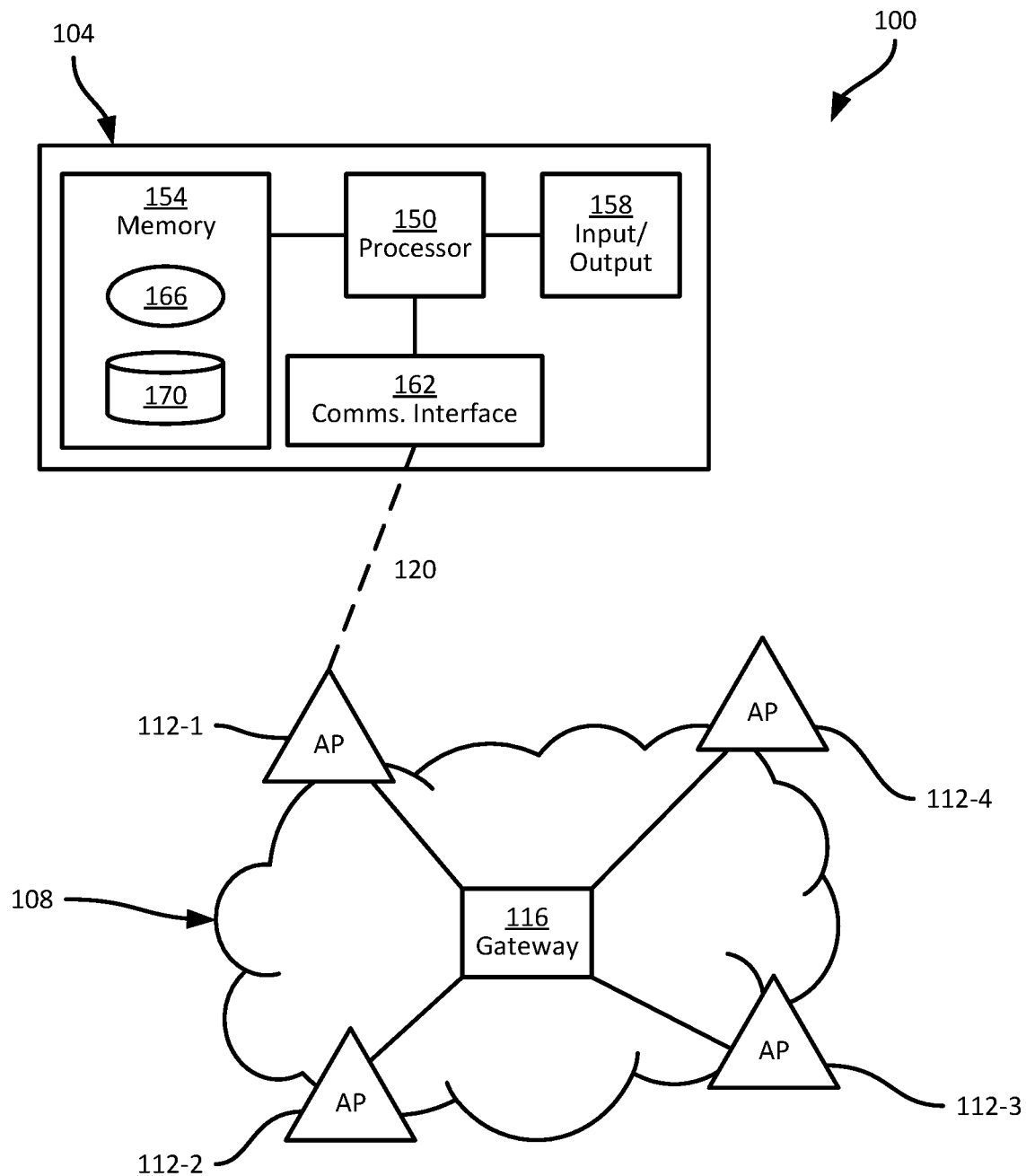
FIG. 1 is a diagram of a communications system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device, including: a wireless communication interface; and a processor configured to: establish a connection with a wireless network; while a network-layer status of the connection is active, monitor attributes of the connection at the wireless communication interface, the attributes including (i) a number of uplink packets transmitted since a most recent downlink packet was received, and (ii) a time period elapsed since the most recent downlink packet was received; determine that the attributes meet recovery criteria indicative of a network-layer interruption in the wireless network; and in response to the determination, control the wireless communication interface to initiate a recovery action to resolve the network-layer interruption.

Additional examples disclosed herein are directed to a method, including: establishing a connection with a wireless network; while a network-layer status of the connection is active, monitoring attributes of the connection at the wireless communication interface, the attributes including (i) a number of uplink packets transmitted since a most recent downlink packet was received, and (ii) a time period elapsed since the most recent downlink packet was received; determining that the attributes meet recovery criteria indicative of a network-layer interruption in the wireless network; and in response to the determination, controlling the wireless communication interface to initiate a recovery action to resolve the network-layer interruption.

Further examples disclosed herein are directed to a non-transitory computer-readable medium storing instructions executable by a processor of a computing device to: establish a connection with a wireless network; while a network-layer status of the connection is active, monitor attributes of the connection at a wireless communication interface, the attributes including (i) a number of uplink packets transmitted since a most recent downlink packet was received, and (ii) a time period elapsed since the most recent downlink packet was received; determine that the attributes meet recovery criteria indicative of a network-layer interruption in the wireless network; and in response to the determination, control the wireless communication interface to initiate a recovery action to resolve the network-layer interruption.

FIG. 1 depicts a wireless communications system 100, including a wireless client computing device 104. The device 104 can be a mobile (e.g., portable) device such as a tablet computer, laptop computer, wearable device, or the like. The device 104 can also be a stationary device, such as a desktop computer or the like. The system 100 can include a plurality of client computing devices 104 in other examples. The device 104 (and any other devices 104 in the system 100), as will be discussed in greater detail below, each include communication interfaces enabling the devices 104 to establish connections with network infrastructure in the system 100.

The network infrastructure implements a wireless network 108, such as a WLAN operating according to a suitable one of the IEEE 802.11 family of wireless standards. In the example of FIG. 1, the network 108 is implemented by infrastructure including wireless access points 112-1, 112-2, 112-3 and 112-4 (collectively the access points 112, and generically an access point 112). In other examples, and the network 108 can be implemented by fewer access points 112 than illustrated, or by a greater number of access points 112 than illustrated. The network 108 can also include additional infrastructure such as a gateway 116 to which the access points 112 are connected, e.g. to route traffic to and from endpoints in the network 108 to endpoints outside the network 108 (e.g. via a suitable wide-area network to which the gateway 116 connects). The network 108 can include additional infrastructural elements in other examples, such as Ethernet switches, WLAN controllers, and the like.

The device 104 is configured to establish a connection 120 with the network 108, e.g. by connecting to a particular access point 112 (e.g. the access point 112-1, in the example shown in FIG. 1). Following such a connection, the device 104 may communicate with other computing devices also connected to the network 108, and/or with other computing devices connected to other networks accessible via the gateway 116. As will be apparent to those skilled in the art, the exchange of data between the device 104 and another computing device, whether that other device is within the network 108 or outside the network 108, involves the routing of packets to and from the device 104 by the access points 112, the gateway 116, and other network infrastructure such as the above-mentioned switches.

In some instances, operational errors in one or more elements of the network infrastructure lead to interruptions in the delivery of packets to and/or from the device 104. For example, software bugs at the access points 112, switches or the like, corrupted or incomplete routing tables in those components, or the like, may lead to packets received from and/or addressed to the device 104 being dropped within the network 108 rather than being successfully delivered. The device 104, however, may have little or no ability to directly detect such failures, because the failures occur within the network infrastructure itself. That is, the above interruptions stem from network-layer problems (e.g. layer 2 or below of the Internet Protocol Suite, or layer 3 or below of the Open Systems Interconnect model) within network infrastructure. The device 104 itself may perceive that the connection 120 remains active and functional. That is, the connection 120 may not directly reveal any network-layer interruption. The communications performance of the connection 120 may therefore degrade to a degree perceptible by an operator of the device 104, e.g. interrupting a voice call or the like, despite no indication being generated by the device 104 that the connection 120 is suffering from reduced performance.

As will be discussed below, the device 104 therefore implements certain functionality to monitor attributes of the connection 120 (e.g. transport-layer attributes, although other attributes can also be monitored) and infer the existence of infrastructural interruptions from such monitoring. The device 104 is further configured, upon detecting a potential interruption caused by the network infrastructure, to initiate one or more recovery actions in an attempt to resolve the interruption.

Certain internal components of the device 104 are also illustrated in FIG. 1. The device 104 includes a central processing unit (CPU), also referred to as a processor 150, interconnected with a non-transitory computer readable storage medium, such as a memory 154. The memory 154 includes any suitable combination of volatile memory (e.g. Random Access Memory (RAM)) and non-volatile memory (e.g. read only memory (ROM), Electrically Erasable Programmable Read Only Memory (EEPROM), flash). The processor 150 and the memory 154 each comprise one or more integrated circuits (ICs).

The device 104 also includes at least one input device, and at least one output device, illustrated as an input/output device 158 interconnected with the processor 150. The input device includes any suitable one, or any suitable combination of, a touch screen, a keypad, a trigger (e.g. to initiate the performance of any encoding task), a keyboard, a mouse, and the like. The output device includes any suitable one, or any suitable combination of a display (e.g., integrated with the above-mentioned touch screen), a speaker, and the like. The input/output device 158 is configured to receive input and provide data representative of the received input to the processor 150, and to receive output from the processor 150 and present the output, e.g. via the emission of sound from the speaker, the rendering of visual indications on the display, and the like.

The client device 104 also includes a communications interface 162, enabling the client device 104 to exchange data with other computing devices, including the access points 112 of the network 108. The communications interface 162 includes a suitable combination of transceiver hardware, such as antenna elements or arrays of antenna elements, analog and digital processing circuitry (e.g. one or more of a radio processor and a digital baseband processor), and the like. The communications interface 162 may, for example, be implemented as a system-on-a-chip (SoC) within the device 104. Such as SoC can include one or more processors and associated memory distinct from the processor 150 and memory 154 mentioned above.

The components of the client device 104 are interconnected by communication buses (not shown), and powered by a battery or other power source, over the above-mentioned communication buses or by distinct power buses (not shown).

The memory 154 of the client device 104 stores a plurality of applications, each including a plurality of computer readable instructions executable by the processor 150. The execution of the above-mentioned instructions by the processor 150 causes the client device 104 to implement certain functionality, as discussed herein. The applications are therefore said to be configured to perform the functionality in the discussion below. In the present example, the memory 154 of the device 104 stores a communications recovery application 166, also referred to herein as the application 166. Execution of the application 166 by the processor 150 configures the processor 150 to monitor certain attributes of the connection 120, and to determine whether the monitored attributes satisfy recovery criteria that are indicative of a network-layer interruption in the network infrastructure (e.g. due to an operational error at the access point 112-1). When the monitored attributes are indicative of a network-layer interruption, the device 104 is further configured to initiate one or more recovery actions automatically, with a view to restoring operation of the connection 120.

The memory 154 also stores, in this example, a repository 170 of recovery criteria sets. As will be discussed below in greater detail, each recovery criteria set can define distinct criteria to be applied to the monitored attributes to determine whether those attributes indicate a likely network-layer problem in the network infrastructure implementing the network 108.

The application 166, in some examples, can be implemented as a driver application for the communications interface 162. In some examples, the functionality performed by the device 104 via execution of the application 166 can be performed by a controller integrated with the communications interface 162 itself, rather than by the processor 150.

Figure 2:
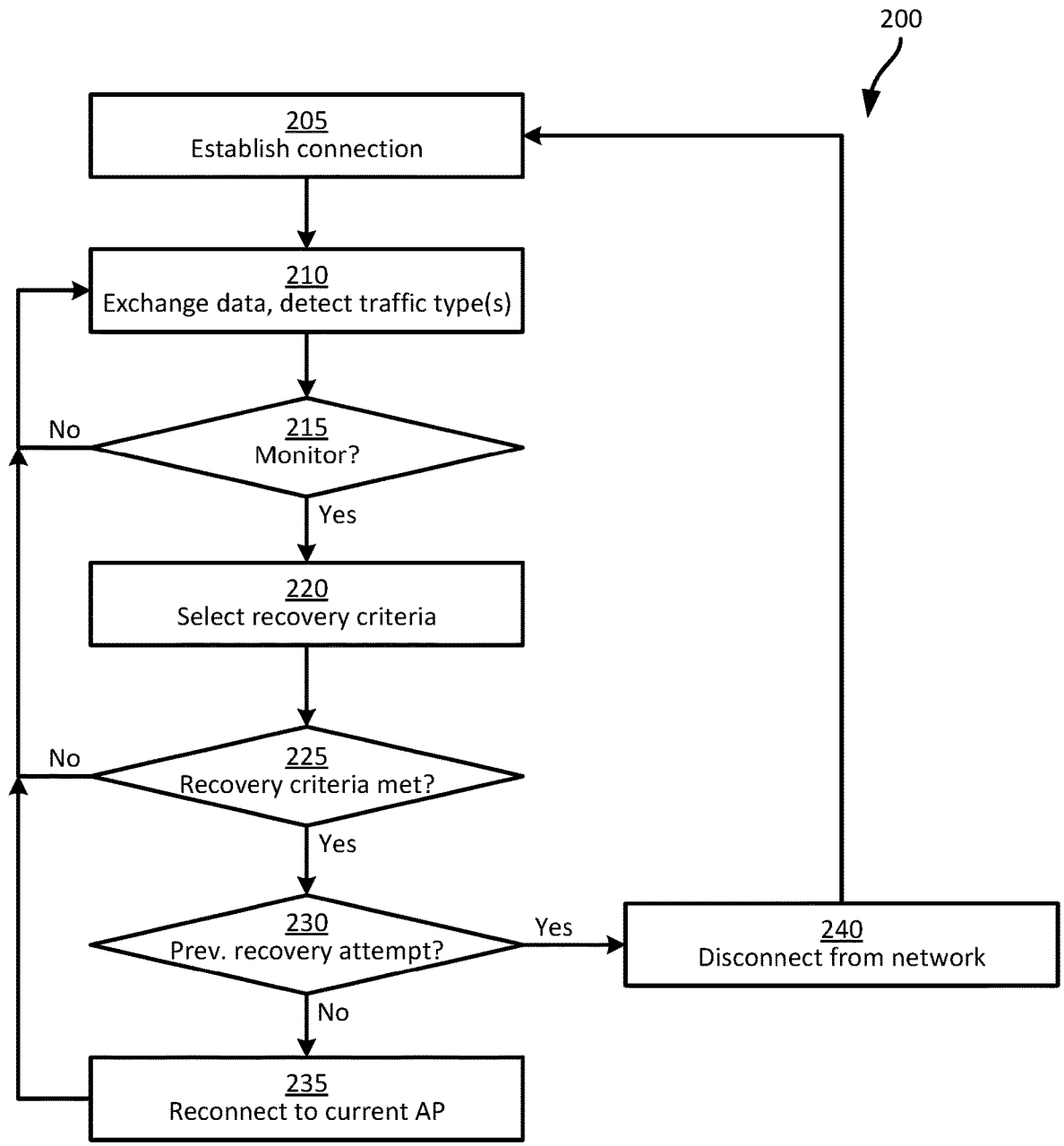
FIG. 2 is a flowchart of a method of detecting and recovering from interruptions in wireless communications.

Turning to FIG. 2, a flowchart of a method 200 of detecting and recovering from network-layer interruptions in wireless communications is illustrated. The method 200 is performed by the device 104, e.g. via execution of the application 166 by the processor 150.

At block 205, the device 104 is configured to establish a connection with the network infrastructure implementing the network 108. For example, the device 104 can be configured to establish the connection 120 shown in FIG. 1, by establishing an association with the access point 112-1. Establishing the connection 120 can also include performing an authentication process, e.g. when the network 108 is an access-controlled network and/or to establish a set of encryption keys for protecting communications over the connection 120.

At block 210, the device 104 is configured to send and receive data over the connection established at block 205. A wide variety of data can be sent and received over the connection 120, employing a variety of communication protocols. The communications interface 162 and/or the processor 150 can be configured to select the appropriate protocols depending on the type of data exchanged. For example, address resolution protocol (ARP) and domain name system (DNS) protocols can be employed to determine various network addresses for other devices (e.g. MAC addresses using ARP, and IP addresses using DNS). In other examples the transport control protocol (TCP) can be employed for data relating to web browsing, communications between the device 104 and hosted applications at other computing devices, and the like. In further examples, the user datagram protocol (UDP) can be employed for voice calls, video calls, and the like. Various other examples of traffic types will also occur to those skilled in the art, along with corresponding communication protocols.

At block 210, the device 104 is also configured to detect traffic types in active use over the connection 120. Traffic type can be determined from metadata fields in uplink packets generated at the communications interface 162 for transmission to the network 108. For example, packets may include identifiers of associated applications at the device 104 (e.g. a Voice over IP application, or the like). In other examples, Quality of Service (QoS) data in the packets may be used to determine traffic types.

At block 215, the device 104 can be configured to determine whether to monitor attributes of the connection 120 at the communications interface 162. The determination at block 210 can be a determination of whether any of the traffic types detected as being active at block 210 are expected to result in downlink traffic (i.e. data received at the device 104). For traffic types that are expected to yield little or no downlink traffic, the determination at block 215 may be negative, as downlink traffic is employed by the device 104 in subsequent portions of the method 200 to infer the presence of network-layer interruptions in the network 108. When the determination at block 215 is negative (i.e. when no active traffic types are expected to yield downlink traffic), the device 104 returns to block 210, e.g. until an active traffic type is detected that is expected to yield downlink traffic.

When the determination at block 215 is affirmative (e.g. when at least one of the active traffic types from block 210 is expected to yield downlink traffic), the device 104 proceeds to block 220. As will be apparent in the discussion of the repository 170 below, the determination at block 215 can be made based on the traffic types represented in the repository 170. For example, if any of the active traffic types detected at block 210 correspond to recovery criteria sets in the repository 170, the determination at block 215 is affirmative, and otherwise the determination at block 215 is negative.

At block 220, the device 104 is configured to begin monitoring attributes of the connection 120. The monitoring of attributes can be performed separately for each traffic type detected at block 210 that is expected to yield downlink traffic (e.g. that appears in the repository 170). Thus, multiple instances of the monitoring actions discussed herein may be performed simultaneously. To initiate the monitoring phase, the device 104 can select recovery criteria at block 220.

The recovery criteria, in general, are criteria that indicate the likely presence of a network-layer interruption within the network 108. In other words, the recovery criteria are selected to detect disruptions to the connection 120 that are sufficiently severe to indicate the likely presence of interruptions caused by faulty network infrastructure, but mild enough that the device 104 may be enabled to correct such interruptions while mitigating the perceptibility of the interruptions to the operator of the device 104. Further, it will be understood that because the above interruptions are caused by network infrastructure and do not result in loss of the connection 120, no explicit indication of the interruptions is available to the device 104. That is, the status of the connection 120 (e.g. the status at the network layer and below) appears as active. The interruptions are instead inferred using the recovery criteria.

In some examples, a single set of recovery criteria are employed for all traffic types, and at block 220 the device 104 therefore simply retrieves that single set of recovery criteria (e.g. from the memory 154). The recovery criteria include at least a threshold number of uplink packets, and a timeout period. The threshold number of uplink packets is the maximum number of uplink packets expected to be transmitted by the device 104 without a corresponding downlink packet being received. The timeout period is the maximum expected length of time for which no downlink packets are expected to be received. It will be understood that the term "expected" is employed above with respect to an operational connection 120. That is, if the monitored attributes of the connection 120 do not align with the above expectations, then the recovery criteria are met, and the device 104 has detected a likely network-layer interruption in the network 108.

In some examples, the selection of recovery criteria is based on traffic type as detected at block 210. As noted above, the repository 170 can contain distinct sets of recovery criteria, each corresponding to a different traffic type. The traffic type can be identified by protocol and/or by a combination of protocol and originating application type. Table 1 below illustrates example contents for the repository 170.

TABLE 1

Example Repository 170

| Traffic Type | Uplink Packet Threshold | Timeout Period (s) |
|---|---|---|
| ARP | 2 | 2 |
| DNS | 3 | 6 |
| TCP | 3 | 3 |
| UDP | 30 | 5 |
| ICMP | 3 | 3 |
| UDP/Voice | 20 | 1 |

As seen above, distinct uplink thresholds and timeout periods are indicated for each of ARP, DNS, TCP, UDP (for non-voice calls), Internet Control Message Protocol (ICMP), and UDP (for voice calls). A wide variety of other thresholds and timeout periods can be employed for the above traffic types, and it will also be apparent that the repository 170 can include additional traffic types and/or omit traffic types given above as examples.

The recovery criteria can also include universal criteria, e.g. applied regardless of traffic type. For example, the device 104 can be configured to assess, in addition to the threshold and timeout period noted above, whether the gateway 116 is reachable. That is, the device 104 can be configured to send a query to the gateway 116 and determine whether a response is received from the gateway 116 to that query within a configurable period of time.

At block 225, the device 104 is configured to monitor the attributes of the connection 120 for each active traffic type, and to determine, for each traffic type, whether the selected recovery criteria are met. In particular, for at least one of the monitored traffic types, if the number of uplink packets since the most recently received downlink packet exceeds the above threshold, and if the time elapsed since the most recent receipt of a downlink packet exceeds the timeout period, the determination at block 225 is affirmative. Otherwise, the determination at block 225 is negative, and the device 104 returns to block 210 to continue monitoring the connection 120 according to the active traffic types, which it will be understood may change over time.

A further recovery criterion can include an origin of the traffic evaluated according to the criteria noted above. For example, in the event that the uplink packet threshold and timeout period for the relevant traffic type are met or exceeded, the device 104 can then determine whether the traffic originated from within the network 108 itself (i.e. internal to the local network), or from an external network. The evaluation of uplink packet thresholds and timeout periods can, for example, be performed separately for internal and external traffic of a given type.

When the threshold and timeout period are exceeded for internal traffic but not for external traffic (that is, external traffic does not display performance issues), the determination at block 225 is negative. When the threshold and timeout period are exceeded for external traffic but not for internal traffic, the determination at block 225 is affirmative. When the threshold and timeout period are exceeded for both internal and external traffic, the determination at block 225 is affirmative. Further, when the threshold and timeout period are exceeded for either origin, with no data for the other origin (e.g. external traffic exceeds the threshold and timeout period, and no internally originated traffic is available to evaluate), the determination at block 225 is affirmative. Table 2 below illustrates the conditions described above, along with the corresponding determination at block 225.

TABLE 2

| Local/Internal Traffic | External Traffic | Block 225 |
|---|---|---|
| Threshold/Time Exceeded | Threshold/Time Not Exceeded | No |
| Threshold/Time Not Exceeded | Threshold/Time Exceeded | Yes |
| Threshold/Time Exceeded | Threshold/Time Exceeded | Yes |
| Threshold/Time Exceeded | No data | Yes |
| No data | Threshold/Time Exceeded | Yes |
| No data | Threshold/Time Not Exceeded | No |
| Threshold/Time Not Exceeded | No data | No |
| Threshold/Time Not Exceeded | Threshold/Time Not Exceeded | No |

In examples in which gateway reachability is also applied as a recovery criterion, the device 104 can be configured to check gateway reachability in response to determining that the number of uplink packets since the most recently received downlink packet exceeds the relevant threshold, and that the timeout period has elapsed. When the gateway 116 remains reachable (i.e. when the device 104 receives a response from the gateway 116), the determination at block 225 is negative. That is, although the absence of expected downlink traffic indicates a problem, the fact that the gateway 116 remains reachable indicates that the problem may not be caused by network infrastructure of the network 108 itself (e.g. by the access points 112).

Figure 3:
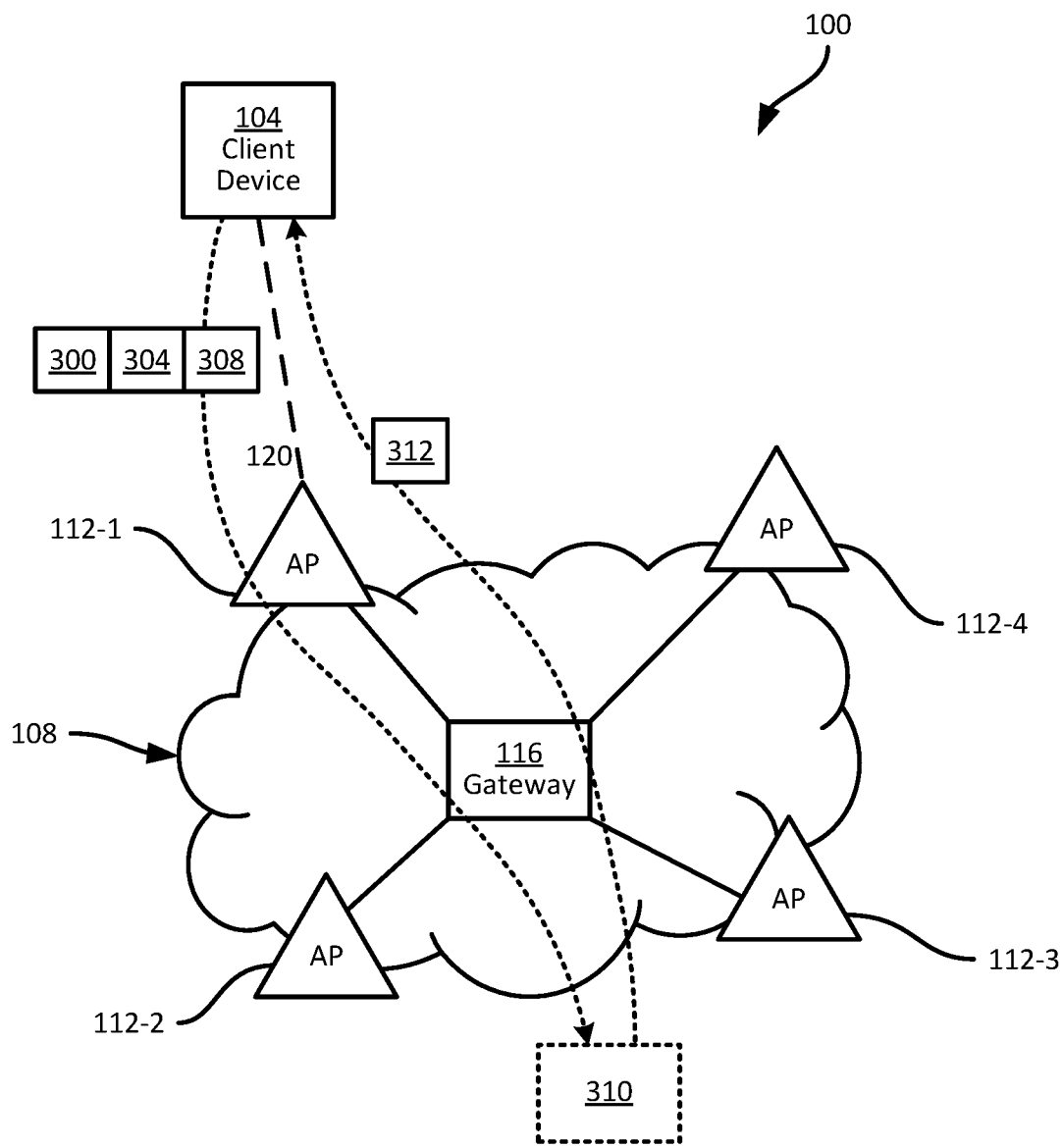
FIG. 3 is a diagram of a performance of the method of FIG. 2 in the system of FIG. 1.

Turning to FIG. 3, an example performance of blocks 205-225 is illustrated, in which the device 104 transmits three uplink packets 300, 304, 308 over the connection 120, e.g. for delivery to a computing device 310 outside the network 108. Within a period of fewer than six seconds, a corresponding downlink packet 312 is received from the computing device 310. Assuming that the packets 300-308 are DNS packets, the above attributes result in a negative determination at block 225. In other words, the recovery criteria are not satisfied, and the device 104 does not infer the presence of a network-layer interruption in the network 108. As noted above, the device 104 therefore continues monitoring the connection 120, beginning at block 210.

Figure 4:
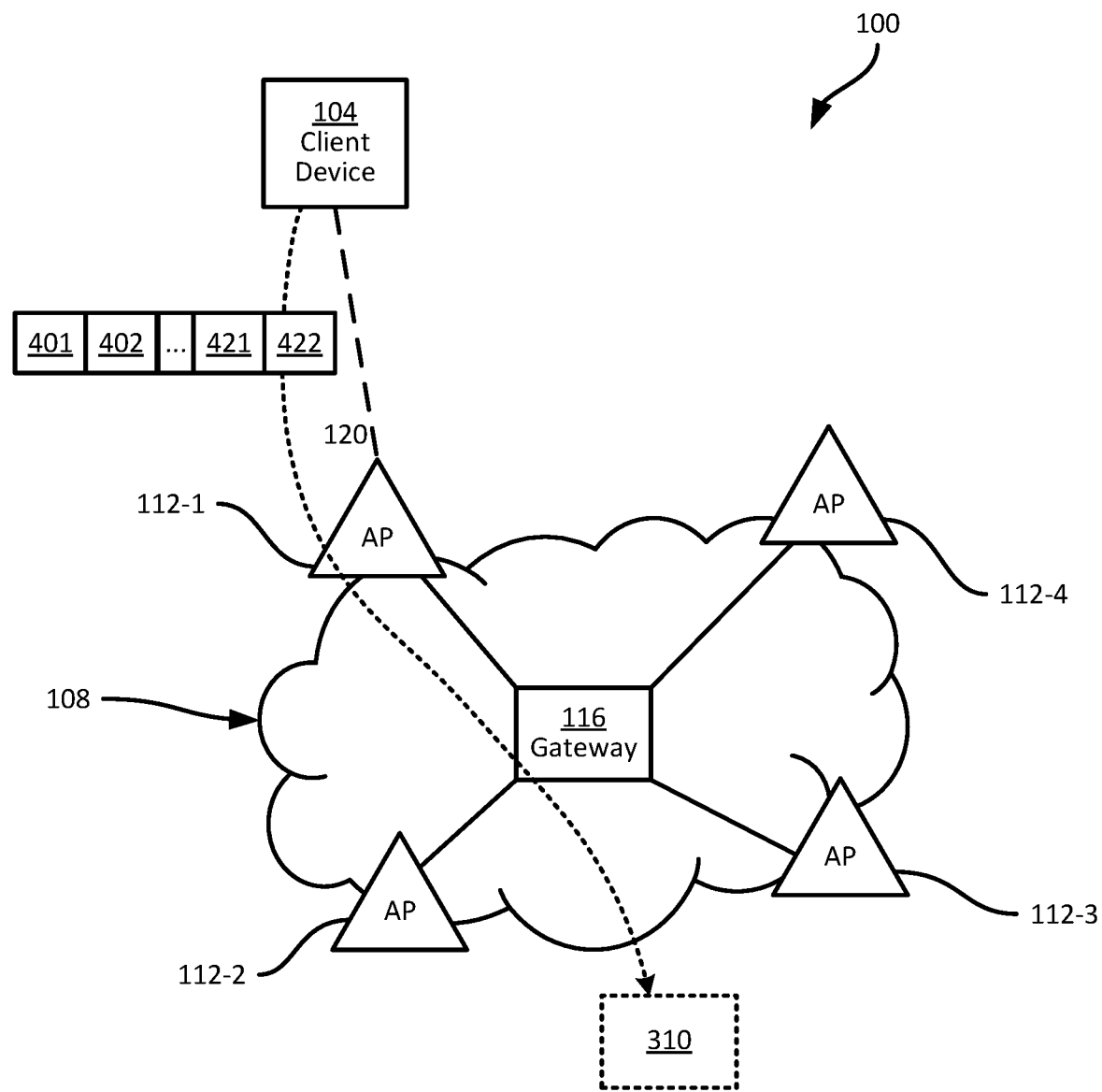
FIG. 4 is a diagram of a further performance of the method of FIG. 2 in the system of FIG. 1.

FIG. 4 illustrates another example performance of connection monitoring, e.g. for the UDP/Voice traffic type. In the example of FIG. 4, a series of twenty-two packets 401, 402, . . . , 421, 422 have been transmitted from the device 104 to the computing device 310 via the network 108, but no corresponding downlink packets have been received since the uplink packet 401 was sent. Further, the timeout period of one second (as specified in Table 1) has elapsed. Therefore, the determination at block 225 is affirmative.

As noted above, an affirmative determination at block 225 indicates that although the status of the connection 120 is active (i.e. no explicit indications of connectivity problems have been received at the device 104), the connection 120 is nevertheless not functioning as expected. The device 104 is configured, following an affirmative determination at block 225, to initiate one or more recovery actions in an attempt to correct any interruptions within the network 108 that are affecting the performance of the connection 120.

At block 230, the device 104 can determine whether previous recovery attempts have been made in connection with the access point 112-1 (that is, the access point 112 to which the device 104 is connected). As will be seen below, the recovery actions taken by the device 104 can escalate based on the outcome of previous recovery actions. The device 104 therefore tracks previous recovery actions, e.g. by storing the identifier(s) of any access point(s) 112 that the device 104 has been connected to when an affirmative determination is made at block 225. The determination at block 230 can therefore include determining whether the identifier of the access point 112 to which the device 104 is currently connected is stored as mentioned above. The determination at block 230 can also include a determination not only of whether the access point identifier is present in storage, but whether the access point identifier was stored within a configurable time period (e.g. within the past hour, or the like), whether the access point identifier has been stored at least a threshold number of times (i.e. for a threshold number of distinct recovery events), and the like.

When the determination at block 230 is negative, the device 104 proceeds to block 235. At block 235, the device 104 is configured to reconnect to the access point 112 with which the connection 120 is currently established (i.e. the access point 112-1 in the illustrated example). The reconnection attempt initiated at block 235 can be, in some examples, a fast roam reconnection in which reauthentication is not required. In other examples, however, the reconnection at block 235 can also include reauthentication. In further examples, the device 104 can select between a fast roam reconnection and a reconnection with reauthentication, e.g. based on the number of previous reconnection attempts. That is, when an insufficient number of recovery attempts have been made to result in an affirmative determination at block 230, the device 104 can determine whether a lower threshold number of recovery attempts have been made. When the lower threshold has not been reached, the reconnection at block 235 can be a fast roam reconnection. When the lower threshold has been reached, the device 104 can initiate the reconnection attempt with reauthentication, rather than via a fast roam procedure.

When the determination at block 230 is affirmative, e.g. when more than a threshold number of reconnection attempts have been made for the access point 112-1, the device 104 proceeds to block 240. At block 240, the device 104 is configured to escalate the attempted recovery process, e.g. by disconnecting entirely from the network 108 and reconnecting (that is, establishing a new connection at block 205).

In other examples, the performance of block 240 may also be broken into multiple stages, each dependent on distinct thresholds at block 230. For example, two distinct thresholds may be applied at block 230, with a first threshold (e.g. three previous recovery attempts) leading not to a complete disconnection, but instead to a forced roam to a different access point 112 than the access point 112 currently connected with the device 104. A second threshold (e.g. five previous recovery attempts) may lead to a complete disconnection.

Following the recovery actions initiated at block 235 or block 240, the device 104 returns to the detection of traffic types and monitoring of attributes of the connection between the device 104 and the network 108, as described above. As noted earlier, the device 104 can also store the identifier of the access points 112 with which the device 104 was connected when affirmative determinations were previously made at block 225, for use in subsequent performances of block 230. In such examples, the device 104 may therefore be enabled to initiate more aggressive recovery actions for certain access points 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A computing device, comprising:
a wireless communication interface; and
a processor configured to:
　establish a connection with a wireless network;
　while a network-layer status of the connection is active, monitor attributes of the connection at the wireless communication interface, the attributes including (i) a number of uplink packets transmitted since a most recent downlink packet was received, and (ii) a time period elapsed since the most recent downlink packet was received;
　determine that the attributes meet recovery criteria indicative of a network-layer interruption in the wireless network; and in response to the determination, control the wireless communication interface to initiate a recovery action to resolve the network-layer interruption.

2. The computing device of claim 1, wherein the recovery criteria include (i) the number of uplink packets exceeding a threshold, and (ii) the time period exceeding a timeout threshold.

3. The computing device of claim 1, wherein the recovery criteria further include an origin of traffic carried over the connection.

4. The computing device of claim 1, further comprising a memory storing a plurality of recovery criteria sets corresponding to respective traffic types;
wherein the processor is configured, prior to the monitoring, to:
detect at least one traffic type from uplink packets transmitted from the wireless communication interface; and
for each detected traffic type, select a corresponding recovery criteria set from the plurality of recovery criteria sets.

5. The computing device of claim 4, wherein the processor is configured, in response to detection of multiple traffic types and selection of multiple corresponding recovery criteria sets, to repeat the monitoring and determining for each selected recovery criteria set.

6. The computing device of claim 1, wherein the processor is configured, to establish the connection, to connect to an access point of the network infrastructure; and wherein the recovery action includes reconnecting to the access point.

7. The computing device of claim 6, wherein the processor is further configured, in response to reconnecting to the access point, to store an identifier of the access point.

8. The computing device of claim 7, wherein the processor is further configured, to initiate the recovery action, to:
determine that the identifier of the access point is stored; and
initiate a roaming process to a further access point.

9. The computing device of claim 7, wherein the processor is further configured, to initiate the recovery action, to:
determine that the identifier of the access point is stored;
disconnect from the network infrastructure; and
establish a new connection to the network infrastructure.

10. The computing device of claim 1, wherein the processor is configured, to determine that the attributes meet the recovery criteria, to assess whether a gateway of the network is reachable.

11. A method, comprising:
establishing a connection with a wireless network;
while a network-layer status of the connection is active, monitoring attributes of the connection at the wireless communication interface, the attributes including (i) a number of uplink packets transmitted since a most recent downlink packet was received, and (ii) a time period elapsed since the most recent downlink packet was received;
determining that the attributes meet recovery criteria indicative of a network-layer interruption in the wireless network; and
in response to the determination, controlling the wireless communication interface to initiate a recovery action to resolve the network-layer interruption.

12. The method of claim 11, wherein the recovery criteria include (i) the number of uplink packets exceeding a threshold, and (ii) the time period exceeding a timeout threshold.

13. The method of claim 11, further comprising:
storing a plurality of recovery criteria sets corresponding to respective traffic types;
prior to the monitoring:
detecting at least one traffic type from uplink packets transmitted from the wireless communication interface; and
for each detected traffic type, selecting a corresponding recovery criteria set from the plurality of recovery criteria sets.

14. The method of claim 13, further comprising, in response to detection of multiple traffic types and selection of multiple corresponding recovery criteria sets, repeating the monitoring and determining for each selected recovery criteria set.

15. The method of claim 11, wherein establishing the connection includes connecting to an access point of the network infrastructure; and wherein the recovery action includes reconnecting to the access point.

16. The computing device of claim 15, further comprising, in response to reconnecting to the access point, storing an identifier of the access point.

17. The method of claim 16, wherein initiating the recovery action includes:
determining that the identifier of the access point is stored; and
initiating a roaming process to a further access point.

18. The method of claim 16, wherein initiating the recovery action includes:
determining that the identifier of the access point is stored;
disconnecting from the network infrastructure; and
establishing a new connection to the network infrastructure.

19. The method of claim 11, wherein determining that the attributes meet the recovery criteria includes assessing whether a gateway of the network is reachable.

20. A non-transitory computer-readable medium storing instructions executable by a processor of a computing device to:
establish a connection with a wireless network;
while a network-layer status of the connection is active, monitor attributes of the connection at a wireless communication interface, the attributes including (i) a number of uplink packets transmitted since a most recent downlink packet was received, and (ii) a time period elapsed since the most recent downlink packet was received;
determine that the attributes meet recovery criteria indicative of a network-layer interruption in the wireless network; and
in response to the determination, control the wireless communication interface to initiate a recovery action to resolve the network-layer interruption.

21. The non-transitory computer-readable medium of claim 20, wherein execution of the instructions further configures the processor to:
store a plurality of recovery criteria sets corresponding to respective traffic types;
prior to the monitoring:
detect at least one traffic type from uplink packets transmitted from the wireless communication interface; and
for each detected traffic type, select a corresponding recovery criteria set from the plurality of recovery criteria sets.

* * * * *